United States Patent [19]

Graham et al.

[11] Patent Number: 5,058,453
[45] Date of Patent: Oct. 22, 1991

[54] TORSIONAL VIBRATION DAMPER

[75] Inventors: Lawrence F. Graham; Victor E. Swanson, both of Peoria, Ill.

[73] Assignee: Caterpillar Inc., Peoria, Ill.

[21] Appl. No.: 348,229

[22] Filed: May 5, 1989

[51] Int. Cl.$^5$ ............................................. F16F 15/10
[52] U.S. Cl. ................................. 74/574; 188/373; 74/573 F
[58] Field of Search .................. 74/572, 574, 573 R, 74/573 F; 464/89; 188/379, 378

[56] References Cited

U.S. PATENT DOCUMENTS

| | | | |
|---|---|---|---|
| 3,121,347 | 2/1964 | Rumsey | 74/574 |
| 3,234,817 | 2/1966 | Williamson | 74/574 |
| 3,512,612 | 8/1969 | Bragg et al. | 188/1 |
| 3,771,380 | 11/1973 | Bahr et al. | 74/574 |
| 3,992,963 | 11/1976 | Khanna | 74/574 |
| 4,872,369 | 10/1989 | Critton et al. | 74/574 |

FOREIGN PATENT DOCUMENTS 2260318 6/1974 Fed. Rep. of Germany ........ 74/574
2033942 12/1970 France ................................. 74/574

*Primary Examiner*—Vinh T. Luong
*Attorney, Agent, or Firm*—Larry G. Cain

[57] ABSTRACT

A damper of vibrations of the viscous fluid type has a two-piece housing of which a plate is formed by a spin-forming process. The formed plate has a plurality of internal walls of which at least a portion of the walls are usable as bearing surfaces after being spinformed and require no further machining thereof. The damper includes a plurality of individual bearings for radially and axially positioning a rotatable weight within the housing to form preselected spaces between the housing and the weight. An annular supply chamber and the preselected spaces have a viscous fluid disposed therein to provide a damping medium between the rotatable weight and the housing.

14 Claims, 4 Drawing Sheets

TORSIONAL VIBRATION DAMPER

TORSIONAL VIBRATION DAMPER

1. Technical Field

This invention relates generally to a torsional vibration damper and more particularly to a damper of vibration of the viscous fluid type which is commonly used for controlling the torsional vibrations occurring during the operation of an engine.

2. Background Art

Torsional vibration dampers are presently used for damping the torsional vibration of an internal combustion engine. One such type of damper is known as a viscous vibration damper and is disclosed in U.S. Pat. No. 3,234,817 issued to S. O. Williamson on Feb. 15, 1966, U.S. Pat. No. 3,512,612 issued to G. O. Bragg, et al on May 19, 1970 and U.S. Pat. No. 3,771,380 issued to Russel F. Bahr, et al on Nov. 13, 1973, all of which are assigned to the assignee of this application. The dampers disclosed in the above listed patents have proven highly successful for damping and tuning purposes. The dampers comprises an annular inertia weight disposed for relative rotation within an annular housing which is fixed to an engine crankshaft for rotation therewith. The space, usually a few millimeters, between the weight and housing is filled with a viscous fluid of which silicon is a prominent example, and the resistance to shear of the film of viscous fluid between the surfaces of the weight and housing produces a damping effect. Bearings are sometimes provided to support the weight relative to the housing to maintain concentricity of the relatively moving parts and prevent destructive contact of one with the other and consequent breaking down and solidification of the viscous component.

The known dampers have been expensive to manufacture and assemble, largely due to the types of housing employed. Such housings, whether cast or drawn, have commonly been constructed in a manner requiring a substantial amount of machining since the draft and surface finishes provided by such manufacturing processes can not be tolerated during the functional operating relationship between the weight and the housing. A further problem has existed with respect to the formation of the reservoir for the viscous fluid. Separate machining operations have usually been required for forming the reservoir after the remainder of the housing has been formed.

The present invention is designed to overcome the above discussed problems of the prior art. The advantages of the present invention will become apparent to one skilled in the art from the following description thereof when read in conjunction with the accompanying drawings.

DISCLOSURE OF THE INVENTION

In one aspect of the invention a torsional vibration damper includes a two-piece housing defining an annular closed chamber and an annular weight of a generally rectangular cross section mounted within the annular closed chamber and being free for relative rotational movement therein. The two-piece housing includes an annular formed plate and a relative flat circular cover plate sealingly secured to the formed plate. The formed plate has a plurality of internal walls including a radially cylindrical inner and outer wall connected together by a transverse end wall spaced from and parallel to the cover plate. The radially outer cylindrical wall extends from the end wall to the cover plate and the inner cylindrical wall extends from the end wall toward the cover plate. The damper further includes a flat circular flange disposed in abutment with and sealingly connected to the cover plate and an annular contoured structure extending between the inner cylindrical wall and the flange and being integrally connected thereto wherein the contoured wall and portion of the weight and the cover plate define an annular supply chamber. The damper further includes bearing means for radially and axially positioning the weight within the annular chamber so that preselected operation spaces are defined between the weight and the two-piece housing; means for sealingly attaching the plate to the housing; and a viscous fluid disposed within the supply chamber and the operating spaces.

The present invention provides an inexpensive, easy to manufacture and assemble, long life damper. Furthermore, the damper has a spinformed plate which reduces the need for machining after being formed and provides walls which can be used for bearing surfaces without further machining being required.

BEST MODE FOR CARRYING OUT THE INVENTION

Figure 1:
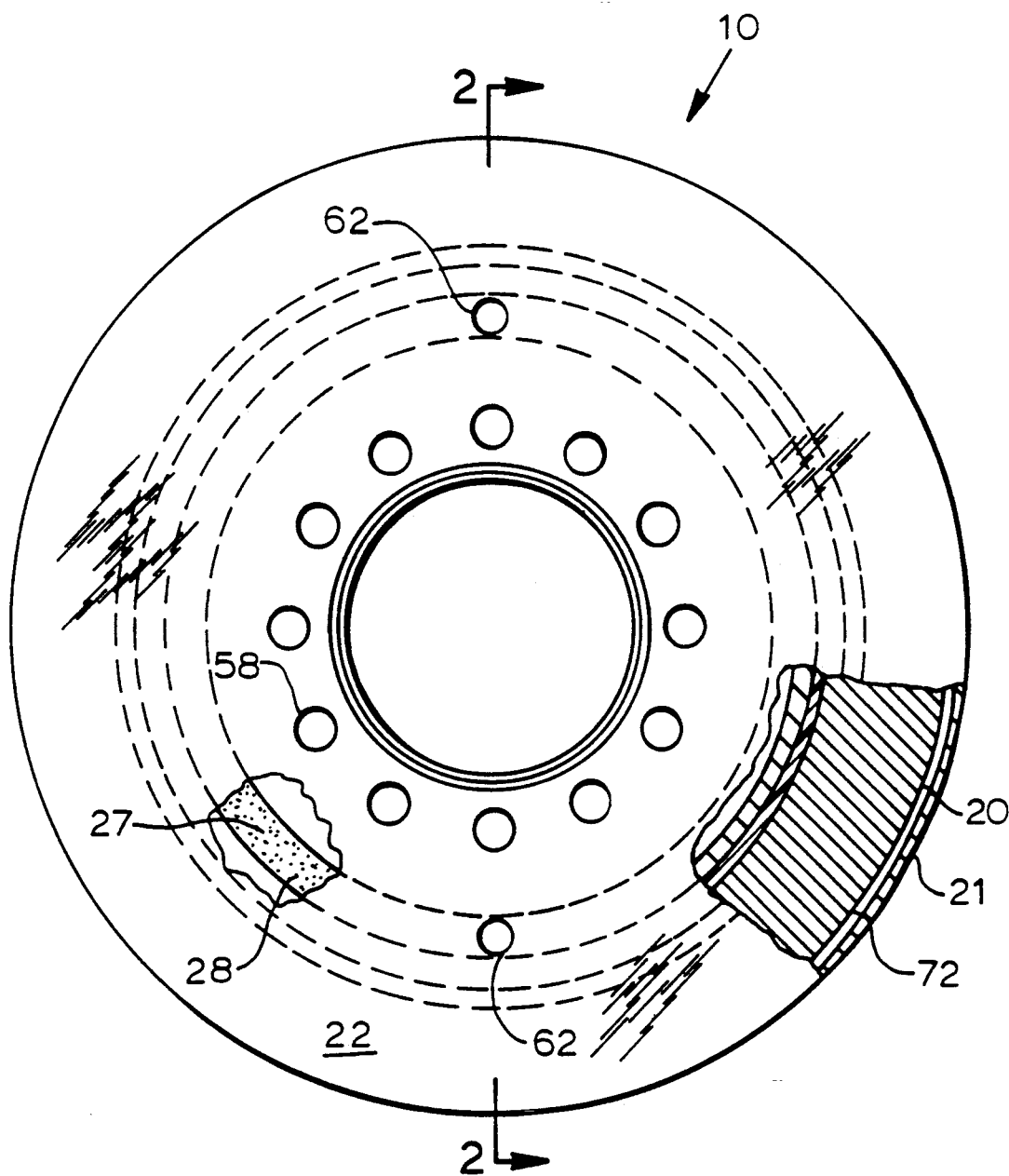
FIG. 1 is an end elevational view of a viscous torsional vibration damper constructed in accordance with the invention with portions broken away for illustrative convinces.
Figure 2:
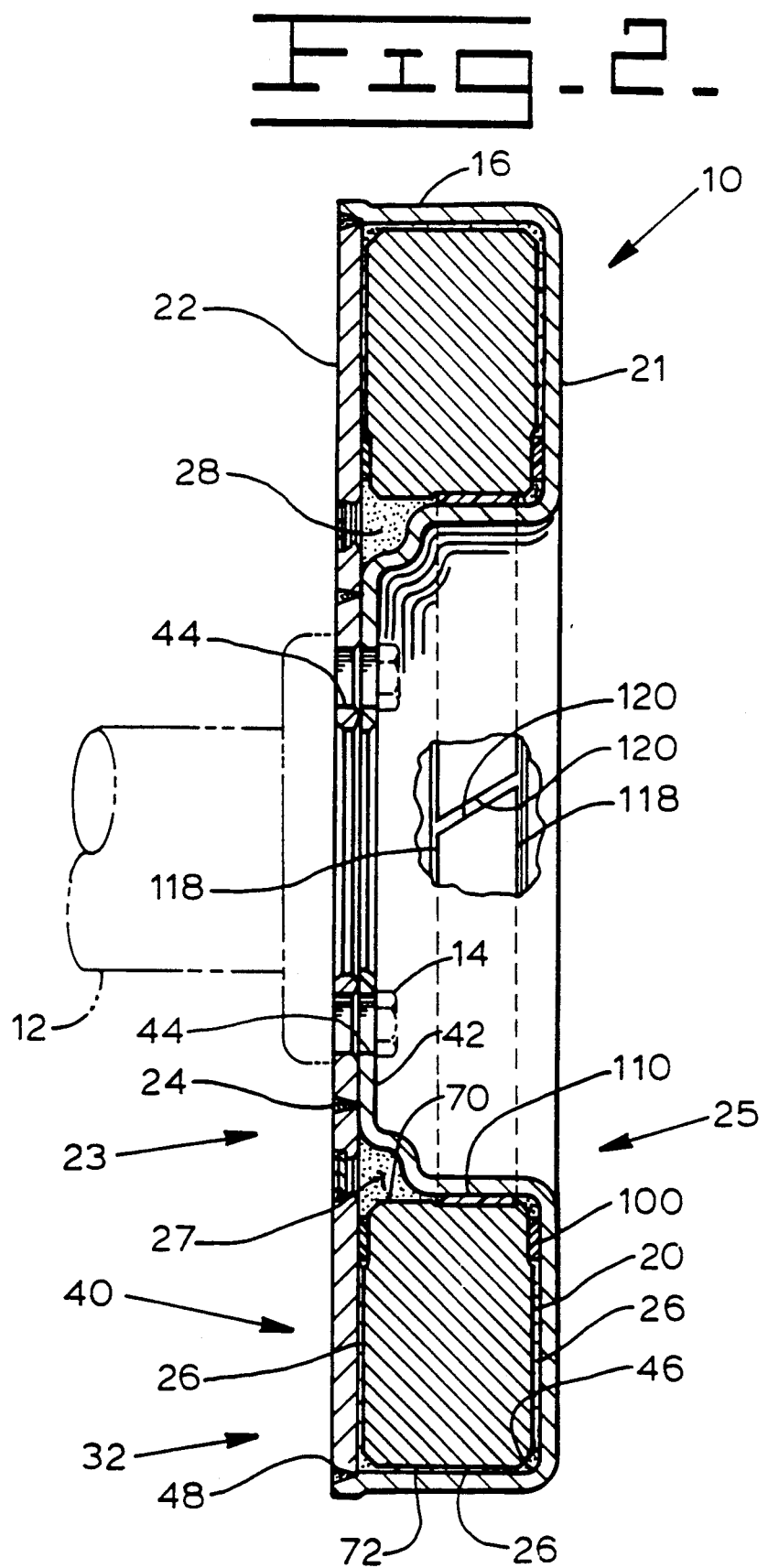
FIG. 2 is a cross-sectional view of the vibration damper of the present invention, taken along line II—II of FIG. 1.
Figure 3:
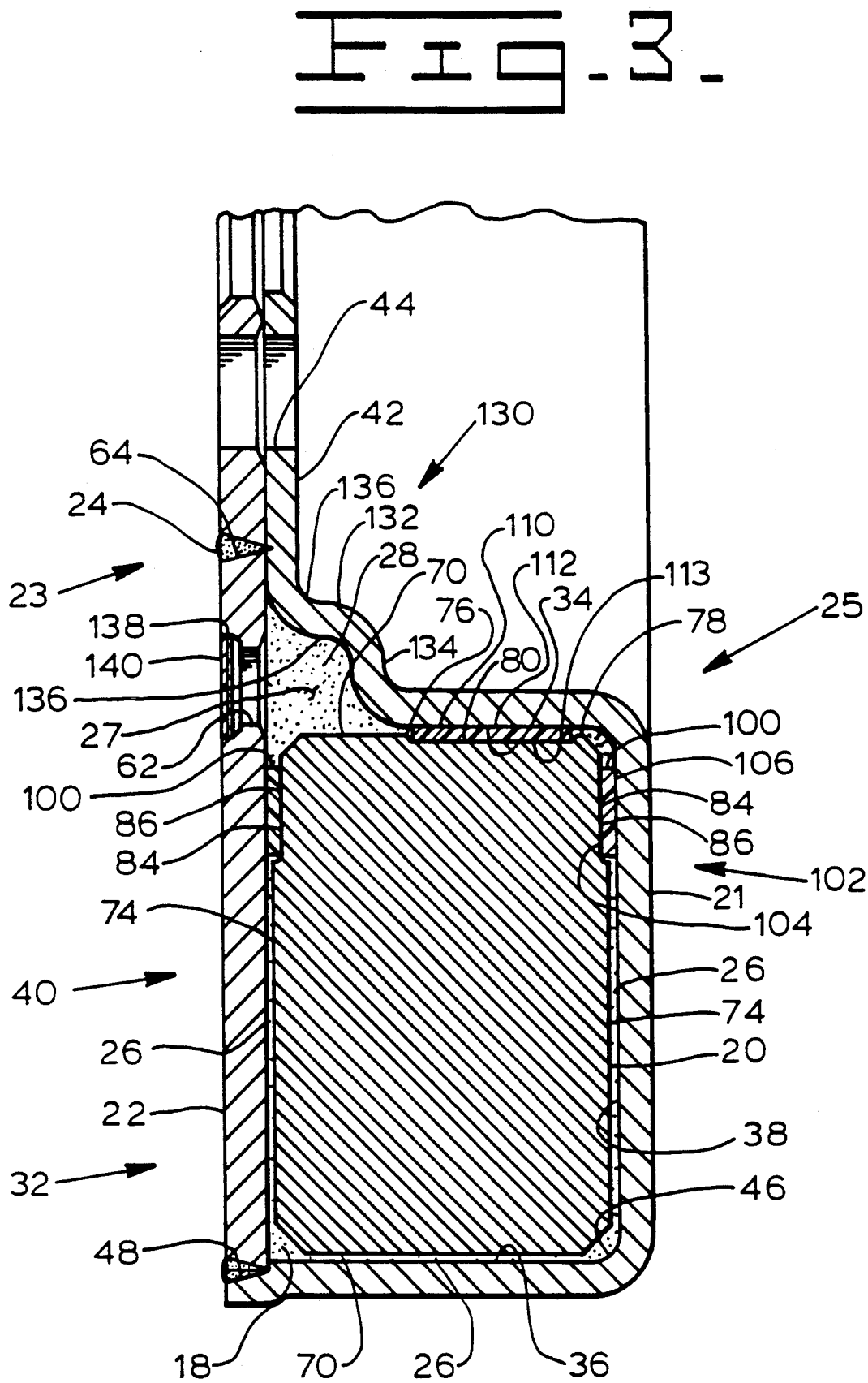
FIG. 3 is an enlarged, sectional view of a portion of the damper illustrated in FIG. 2.

Referring to FIGS. 1–3, a viscous torsional damper 10 has a central rotational axis "X" and is adapted to be attached to a crankshaft 12 of an internal combustion engine, not shown, by circumferentially spaced bolts 14. For illustration convenience, the crankshaft 12 and the bolts 14 are shown in phantom. The damper 10 includes a two-piece housing 16 defining an annular chamber 18 and has an annular weight 20 of generally rectangular cross section mounted in the annular closed chamber 18 and being free for relative rotational movement therein. The two-piece housing 16 includes an annular formed plate 21 and a relative flat circular cover plate 22 secured together by a sealingly attaching means 23. In this specific application, the means 23 includes an electron-beam weld process 24 but could include other attaching means such as a plurality of bolts and seals. The housing and plate may each comprise a cold rolled SAE 1008, aluminum killed low carbon steel, for example, which is particularly adapted for forming and electron-beam welding.

The damper 10 further includes bearing means 25 for radially and axially positioning the weight 20 within the annular chamber 18 so that preselected operating spaces or clearance 26 are defined between the weight 20 and the two-piece housing 16. In this specific application, the space 26 between the weight 20 and the housing 16 is in the range of about 0.05 to 3.75 mm. An annular supply chamber 27 is defined by the formed plate 21 and the cover plate 22. A viscous fluid 28 is disposed within the supply chamber 27 and at least a portion of the preselected operating spaces 26. The supply chamber 27 has an area or reservoir larger than the combined area of the operation spaces 26.

Figure 4:
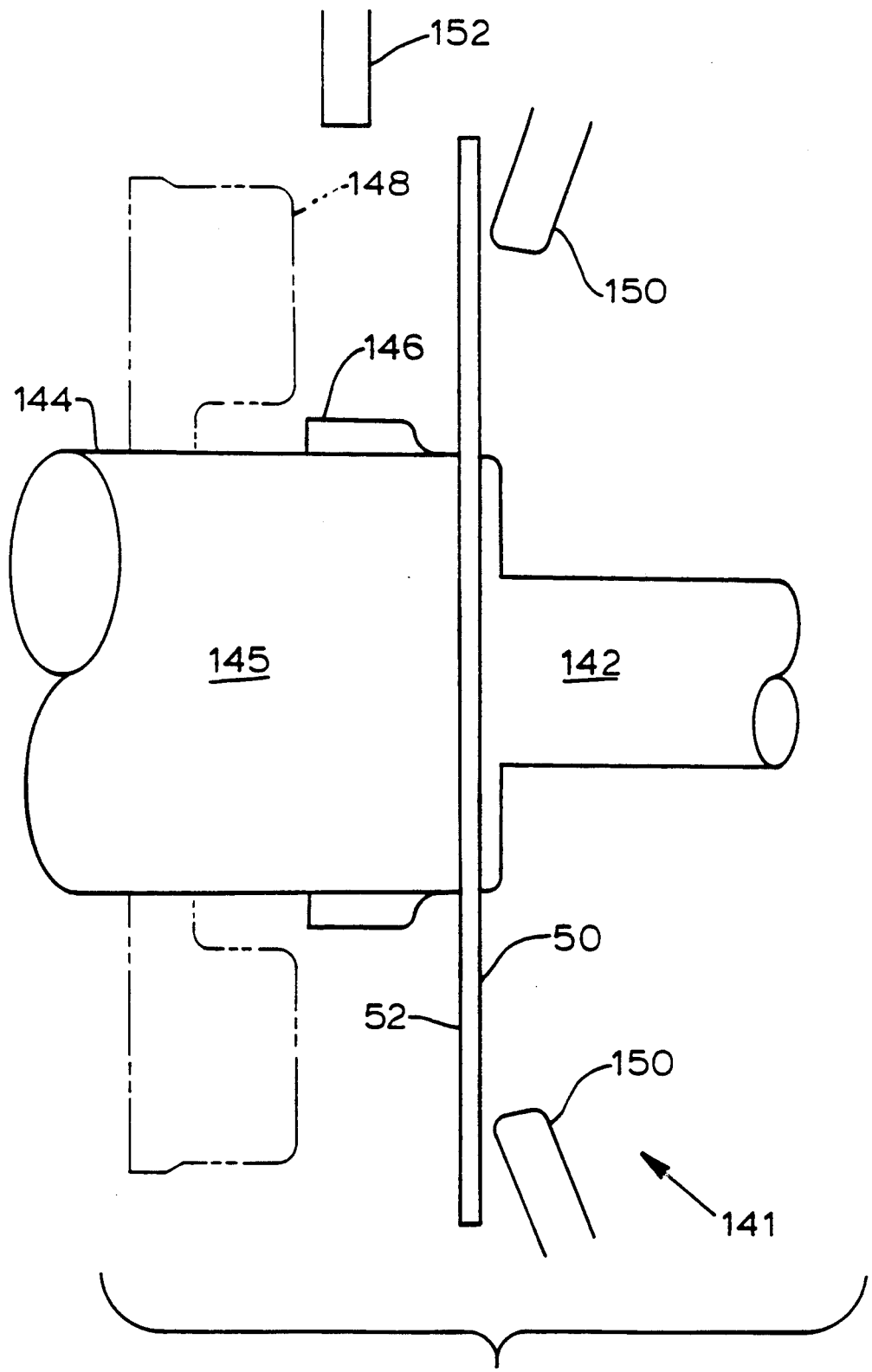
FIG. 4 is a diagrammatic view of the equipment and fixtures used in spinforming the housing as illustrated in the above FIGS.

The formed plate 21 has a plurality of internal walls 32 including a radially cylindrical inner and outer wall 34,36. The walls 34,36 are connected together by a transverse end wall 38 which extends radially outwardly from the axis "X" between the inner and outer walls 34,36 and spaced from and parallel to the cover plate 22. The inner wall 34 extends from the end wall 38 toward the cover plate 22 and the outer wall 36 extends from the end wall 38 to the cover plate 22. The walls 34,36,38 define a channel shaped annular open chamber 40. An annular flange 42 is connected to the inner wall 34 and extends inwardly toward the axis "X". A plurality of mounting holes 44 are provided in the annular flange 42 and are positioned for receiving the bolts 14. An annular contoured structure includes a plurality of blending portions 46 interposed between the walls 34,36,38 and a free edge 48 is provided on the outer wall 36 at one end thereof. The free edge 48 has a preselected configuration so that the circular cover plate 22 fits therein and is adapted to be sealingly secured by the electron-beam welding process 24. The blending portions 46 have a radius being of the same size and due to the forming process include compressive stress thereon. As best shown in FIG. 4 the formed plate 21 is formed from a washer shaped ring 50 having a preestablished thickness "T" and a mounting surface 52. The plurality of mounting holes 44, best shown in FIG. 1, can be stamped or machined in the ring 50.

The flat circular cover plate 22 is positioned in abutment with the free edge 48 of the formed plate 21 and includes an inner circular mounting hole 58 adapted to be piloted on the crankshaft 12. A plurality of mounting holes 60 are provided in the plate 18 and are positioned in alignment with the circumferentially spaced bolts 14. A pair of filler holes 62 and a plurality of grooves 64 are provided in the plate 18.

The weight 20 may comprise an iron casting or other weighty material which has a totally machined exterior with a preestablished roughness average (Ra) ranging from about 0.04 to 1.60 micrometers. The above mentioned range insures that the surface formed in the manufacturing process will provide the proper surface finish to interact with the bearing means 25 during the rotation of the weight 20 relative to the housing 16. It has been further speculated that the surface finish of the rotational weight 20 will vary the damping and tuning characteristics of the damper 10. The weight 20 includes a circular inner surface 70, a circular outer surface 72 and a pair of transverse side surfaces 74 extending radially between the inner surface 70 and the outer surface 72. The weight 20 further includes a first and second retaining shoulder 76,78 and a bearing surface or an offset recess 80 therebetween. The first retaining shoulder 76 extends radially from the inner surface 70 and is spaced a first distance "D$_1$" from one of the side surfaces 74. The second retainer shoulder 78 is spaced a second distance "D$_2$" from the other one of the side surfaces 74. The bearing surface 80 extends substantially parallel with the axis "X". The first distance "D$_1$" is greater than the second distance "D$_2$". In this specific application, the distance "D$_1$" is equal to about 15 mm and the distance "D$_2$" is equal to about 5 mm. A pair of side recesses 84 each has a bearing surface 86 extending radially outwardly from the inner surface 72 and are inwardly of the pair of side surfaces 74. Each of the corners on the weight 20 has a chamfer thereon to reduce stresses and to provide a clearance or space between a portion of the blending portions 46 and the weight 20.

The bearing means 25 include a plurality of individual bearings 26 which further includes a pair of bearings 100 for radially positioning the weight 20 relative to the housing 16. The pair of bearings 100 has a flat washer like configuration and are position in the side recesses 84 between the formed plate 21 and the weight 20. In this specific application, a preestablished clearance between the weight 20, the bearing 100 and the housing on each side are about 5 mm to provide a clearance for the viscous fluid to flow therethrough. The washer like configuration includes a pair of radially disposed bearing surfaces 102, one being an inner side bearing surface 104 for contacting the weight 20 and the other being and outer side bearing surface 106 for contacting the formed plate 21 or the cover plate 22. The plurality of individual bearings 26 further includes a split ring bearing 110 positioned in bearing operating relationship to the bearing surface 80 and the inner wall 34 between the first and second shoulder 76,78. The bearing 110 has a pair of axial extending inner and outer bearing surfaces 112,113 respectfully thereon. The ring 110 further includes a pair of edges 118 and a pair of spaced apart ends 120 having a space or clearance between the ends greater in the non-operating condition than in the operating condition to compensate for thermal expansion of the bearing 110. The ends 120 are formed at an angle other than 90° relative the edges 118 so that a bearing surface is provided between the weight 20 and the inner wall 34 of the formed plate 21 even though a clearance is provided between the ends 120. In this specific application, the angle relative the edge is about 30+ and the spaced apart distance is about 2 mm in the operating condition. The space between the ends 120 also is used to compensate for variation in the manufacturing tolerance of the inner wall 34.

The annular supply chamber 27 extends the full circumference of the formed plate 21. The chamber 27 is in fluid conducting relationship to the annular closed chamber 18. The chamber 27 is formed by a contoured structure 130 including a transverse leg 132 extending radially inward from the inner wall 34 of the housing 18 toward the axis "X". A radial leg 134 extends parallel to the axis "X" between the transverse leg 132 and the annular flange 42. The chamber 27 is further formed by a plurality of blending portions 136 between the transverse leg 132 and the inner wall 34, the transverse leg 132 and the radial leg 134 and the radial leg 134 and the annular flange 42. The blending portions 136 have a radius being of the same size and due to the forming process includes a compressive stress thereof. A portion of the plate 22 and the chamber 18 completes the parameters of the supply chamber 27. The chamber 27 is filled via one of the filler holes 62 with the highly viscous fluid 28 having a viscosity between about one million centistokes and four hundred thousand centistokes of silicone fluid. A lead seal 138 and an overlying Welsh-type expansion plug 140 retain the fluid in the chamber 27 and the space or clearance remaining in the annular closed chamber 18.

The electron-beam welding process 24 is positioned so that each of the welds penetrates through the plate 22 and into the plate 21.

As best shown in FIG. 4, the housing is preferably fabricated by a convention spinforming equipment and fixtures 141. The fixtures 141 includes a driven securing member 142, a driving securing member 144 positioned in contact with the ring 50. A multi-piece mandrel 145 includes a first die 146 having a preestablished contour to match a portion of the contour of the formed plate 21 and the supply chamber 27 and a second die 148 having a preestablished contour to match the remaining portion of the contour of the formed plate 21. A plurality of forming tools or rollers 150 are positioned in preestablished pressure contacting relationship with the ring 50 to cause the ring 50 to conform in shape to the contour of the first and second dies 146,148. The spinforming operation results in the internal walls 32 of the housing 16 having a roughness average (Ra) ranging from about 1.6 to 3.2 micrometers while controlling the perpendicularity, parallelism and straightness within preestablished tolerances without requiring further machining of the internal walls 32. The surface finish resulting from the spin forming operation has a rounded edge verses a sharp edge resulting from a machining operation. Thus, the roughness average of the spinformed surface can be greater than the roughness average of a machining operation without causing malfunction of the relative effect or rotational reaction between the rotating components. The spinforming reduces the thickness "T" in the blending portion 46,136 in the range from about 10 to 15 percent. A cutoff tool 152 and a portion of the second die are used to form the free edge 48.

The ring 50 is secured by the securing members 142,144. The ring, the securing members 142,144 and the mandrel are rotated. A portion of the forming rolls 150 is moved into contact with the mounting surface 52 of the ring 50 and pressure is applied to cause the ring 50 to at least practically conform to the contour of the first die 146. After forming a portion of the contour, the ring 50 is removed, repositioned and secured and the forming rolls are moved into contact with the side opposite the mounting surface 52 of the ring 50 and pressure is applied to cause the ring 50 to at least practically conform to the contour of the second die 148, shown in phantom, at another portion of the housing 16. The legs 132,134 and the blending portions 136 forming the supply chamber 27 are formed to the contour of the first die 146 after the general configuration of the housing 16 has been completed. The forming of the overall configuration of the housing 16 may require a series of passes by the plurality of forming rolls 150.

INDUSTRIAL APPLICABILITY

The torsional vibration damper 10 of the present invention is used to control the torsional vibrations occurring during the operation of an internal combustion engine. In operation, the damper 10 is attached to the crankshaft 12 of an engine. The weight 20 which is disposed within the annular closed chamber 18 is free to rotate relative to the formed plate 21 and the two-piece housing 16 and is supported by the bearing means 25. The space or clearance between the weight 20 and the housing 16 and the supply chamber 27 are filled with the highly viscous silicon fluid 28. The resistance to shear of the film of viscous fluid between the surfaces of the weight 20 and two-piece housing produces a damping effect. The individual bearing 110 support the weight 20 relative to the housing 16 and the pair of bearing 100 maintain concentricity of the relatively moving parts and prevent destructive contact of one with the other and consequent breaking down and solidification of the viscous component.

The damper 10 is economical to manufacture, and easy to assemble. At the same time a high quality of service is provided. These advantages result primarily from the spinforming method of fabricating the housing 16 and the use of electron-beam welding 24 as the means 20 for sealingly attaching the plate 22 to the formed plate 21. Through the use of spinforming, close overall manufacturing tolerances such as dimensional, geometrical and surface finish are obtained while at the same time many of the machining operations which would otherwise be required are eliminated. In addition, the annular supply chamber 27 is formed simultaneously with the remainder of the formed plate 21.

The use of electron-beam welding process 24 eliminates the distortion that is usually associated with more conventional types of welding and also provides a comparatively deep penetration of materials such as is particularly required for the sealing and attaching means 23. In addition, electron-beam welding process 24 is accomplished without the use of additional materials, such as are often required with other types of welding.

Other aspects, objects and advantages will become apparent from a study of the specification, drawings and appended claims.

We claim:

1. A torsional vibration damper includes a two-piece housing defining an annular closed chamber and an annular weight of a generally rectangular cross section mounted within the annular closed chamber and being free for relative rotational movement therein comprising:

said two-piece housing including an annular formed plate and a relative flat circular cover plate sealingly secured to the formed plate;

said formed plate having a plurality of internal walls including a radially cylindrical inner and outer wall connected together by a transverse end wall spaced from and parallel to the cover plate, said radially cylindrical outer wall extending from the end wall to the cover plate, and said cylindrical inner wall extending from the end wall toward the cover plate, an annular flange disposed in abutment with and sealingly connected to the cover plate and an annular contoured structure extending between the cylindrical inner wall and the annular flange and being integrally connected thereto by the contoured structure, a portion of the weight, the contoured structure and the cover plate generally define a fully annular supply chamber, said contoured structure generally including a blending portion interposed between the annular flange and the cylindrical inner wall;

bearing means for radially and axially positioning the weight within the annular closed chamber so that a plurality of preselected operation spaces are defined between the weight and the two-piece housing;

means for sealingly attaching the cover plate to the annular formed plate; and a viscous fluid disposed within the supply chamber and at least a portion of the operating spaces.

2. The damper of claim 1 wherein said two-piece housing is formed by a spinforming process.

3. The damper of claim 2 wherein said housing is formed from a killed low carbon steel.

4. The damper of claim 3 wherein said killed low carbon steel includes aluminum.

5. The damper of claim 2 wherein said plurality of internal walls of the formed plate are usable as a bearing surface after being spinformed.

6. The damper of claim 2 wherein said formed plate has a preestablished wall thickness and the blending portion of the formed plate have a reduced wall thickness ranging from about 10 to 15 percent of the preestablished wall thickness of the housing.

7. The damper of claim 6 wherein said blending portions have a radius being of the same size and due to the forming process include a compressive stress thereon.

8. The damper of claim 1 wherein said weight further includes an inner surface, a pair of side surfaces and a bearing surface, a first retaining shoulder extending radially from the inner surface and spaced a first distance "$D_1$" from one of the side surfaces, a second retaining shoulder spaced a second distance "$D_2$" from the other of the side surfaces, said first distance being greater than said second distance.

9. The damper of claim 8 wherein the bearing means includes a plurality of individual bearings and one of the individual bearings is positioned in bearing relationship between the weight and the housing.

10. The damper of claim 9 wherein at least one of the individual bearing is a split ring bearing having a pair of bearing surfaces thereon, a pair of edges and a pair of ends which are spaced apart and formed at an angle other than 90° relative the edges, said space or clearance between the ends being about 2 mm in the operating condition and at a greater clearance in the non-operating condition.

11. The damper of claim 1 wherein said weight further includes an inner surface, a pair of side surfaces and a pair of side recesses having a first bearing surface extending radially outwardly from the inner surface and inwardly of the side surface.

12. The damper of claim 1 wherein a plurality of preselected operating spaces have a preestablished clearance between the weight and the walls of the housing being in the range of about 0.50 to 3.75 mm.

13. The damper of claim 1 wherein said sealingly attaching means includes a plurality of grooves and an electron-beam welding process.

14. The damper of claim 1 wherein said bearing means includes a pair of bearing having a flat washer like configuration disposed between the weight and the two-piece housing and a split bearing disposed between the two-piece weight and the housing.

* * * * *